US005933827A

United States Patent [19]
Cole et al.

[11] Patent Number: 5,933,827
[45] Date of Patent: Aug. 3, 1999

[54] SYSTEM FOR IDENTIFYING NEW WEB PAGES OF INTEREST TO A USER

[75] Inventors: Gary Lee Cole, Endicott; Scott Phillip Engleman, Vestal, both of N.Y.

[73] Assignee: International Business Machines Corporation, Armonk, N.Y.

[21] Appl. No.: 08/719,512

[22] Filed: Sep. 25, 1996

[51] Int. Cl.$^6$ .................................................. G06F 17/00
[52] U.S. Cl. .............................. 707/10; 707/6; 707/5; 707/4
[58] Field of Search ........................................... 707/1–206

[56] References Cited

U.S. PATENT DOCUMENTS

| | | | |
|---|---|---|---|
| 5,359,730 | 10/1994 | Marron | 398/650 |
| 5,421,009 | 5/1995 | Platt | 395/600 |
| 5,423,042 | 6/1995 | Jalili et al. | 395/700 |
| 5,490,270 | 2/1996 | Devarakonda et al. | 395/600 |
| 5,742,816 | 4/1998 | Barr et al. | 707/3 |
| 5,754,938 | 5/1998 | Herz et al. | 455/4.2 |
| 5,754,939 | 5/1998 | Herz et al. | 455/4.2 |
| 5,784,608 | 7/1998 | Meske et al. | 707/3 |
| 5,806,061 | 9/1998 | Chaudhuri et al. | 707/3 |

OTHER PUBLICATIONS

IBM Technical Disclosure Bulletin vol. 36, No. 09B, Sep. 1993, .Filtering Of Multimedia Links —'Webs of Hyper--Links'—Using Predefined Attributes., by Eisen et al.

Proc. Seventh International Conference on Tools w/Artificial Intelligence Nov. 1995, by Pazzani et al (Abstract).

J. Intell, Inf. Syst. vol. 5, No. 2, Sep. 1995, .International Information Filtering., by Binkley et al (Abstract).

*Primary Examiner*—Wayne Amsbury
*Assistant Examiner*—David Yiuk Jung
*Attorney, Agent, or Firm*—Arthur J. Samodovitz

[57] ABSTRACT

A computer system identifies web pages of interest to a client. The system comprises a cataloging function which defines a hierarchy of subject categories, logically arranges a multitude of web pages in the categories and periodically adds web pages to the categories. The system also comprises a profile building function which receives selections of categories from a user, records the selections and responds with an identification of subcategories of each selected category. The user can make further selections from the subcategories. Alternately, the user makes a key word search and then selects data web pages from the results of the search. The profile building function records the categories of the data web pages selected by the user. Next, the user requests a list of recently added web pages of interest to the user. In response, the system identifies recently added web pages from the categories previously selected by the user and from the categories of the data web pages previously selected by the user.

14 Claims, 20 Drawing Sheets

HEADER 203

203

BROAD CATEGORIES OF HIERARCHY:

RECREATION    ARTS    BUSINESS    SCIENCE    EDUCATION    • • •    42

KEY WORD SEARCH DEFINITION _____ 317

209

TRAILER 204

HTML:// WWW (SERVER 10 ADDRESS).COM

207

"WHAT IS NEW" TO CATALOGING FUNCTION:

| AUGUST 1, 1996 | AUGUST 2, 1996 | AUGUST 3, 1996 |
|---|---|---|
| RECREATION | GAMES | EDUCATION |
| RE10 | GA20 | ED30 |
| RE11 |  | ED31 |
| BUSINESS | SPORTS | GOLF |
| BU10 | SP20 | GO30 |
| BU11 | SP21 | GO31 |
| BU12 | SP22 |  |
| BU13 |  |  |
| SPORTS | RECREATION | AVIATION |
| SP10 | RE20 | AV30 |
| SP11 | RE21 |  |
| SP12 |  |  |

FIG. 3

HEADER 203                      203

BROAD CATEGORIES OF HIERARCHY:

RECREATION   ARTS  BUSINESS   SCIENCE  EDUCATION   ...   42

KEY WORD SEARCH DEFINITION _____ 317

} 209

TRAILER 204

HTML:// WWW (SERVER 10 ADDRESS).COM

207

"WHAT IS NEW" FOR CLIENT A'S INTERESTS FOR AUGUST 1-3:

RECREATION

RE10
    RE11
    RE20
    RE21

SPORTS

SP10
    SP11
    SP12
    SP20
    SP21
    SP22

GOLF

GO30
    GO31

GAMES

GA20

BUSINESS

SYSTEM FOR IDENTIFYING NEW WEB PAGES OF INTEREST TO A USER

BACKGROUND OF THE INVENTION

The invention relates generally to computers and the world wide web, and deals more specifically with a server which identifies new web pages of interest to a user.

The world wide web (WWW) comprises a multitude of computer servers, respective databases and a network by which clients can communicate with the servers and request and load the data. Each of the clients includes a "web browser" which is an interface to the user and to the WWW. A server may directly manage its own database and access other, remote databases on behalf of a client user.

The server presents the data to the client as "web pages" and each web page has a "URL" address which comprises an access method/protocol such as http as a prefix, a server name and the requested data as a suffix. The server name typically includes a "domain name" which is the name of a company, educational institution or other organization that owns the server. The request indicates a web page associated with the server. There are different ways that a client can access a web page. If the client knows the URL, the client can directly request the web page from the server. However, if the client only knows the server name, the client can address the server name and in response, the server will present the "home page" for the server. The home page (and other web pages) typically includes tags or "hot links" which reference the associated web pages. When the user selects a hot link, the web browser requests the respective web page from the corresponding server.

Today, there is a vast amount of data on the WWW. Many servers and thousands of web pages are added daily. This presents a problem in identifying the web pages of interest to a user. For those web pages for which the user does not know at least the server name, there are different techniques to "surf the net", i.e. identify the server and/or web page. There are different types of search engines that are currently available. A Yahoo (tm) server includes a catalog search engine and Alta Vista (tm) and Web Crawler (tm) servers include key word search engines.

Key word search engines function by searching various databases for key words (with logical connectors) specified by the user. For example, if a user is interested in golf, the client can enter the word "golf" as a search word. Then, the search engine identifies those web pages which include the word golf. Then, the web browser typically presents a list of the identified web pages to the client. This list includes a title of each web page and a hot link to actually access the respective web page. If the client selects the hot link, then the server sends the respective web page to the client. While key word searches are easy to initiate, they tend to yield a large number of web pages which are not of interest to the client.

Catalog servers initially define a hierarchy of subject categories or topics as illustrated in FIG. 1. Most of the categories also include hot links to web pages relating to the subject of the respective category. The client then "navigates" down through the hierarchy to identify a category of interest and then can select a hot link to obtain a web page containing actual data within the same subject. The catalog server obtains its web pages from other databases or human editors, and periodically adds them to the appropriate category in the hierarchy.

One such type of catalog server is provided by Yahoo Corporation. The Yahoo (tm) server presents a list of several broad categories 42 such as recreation, arts, business, science, education etc. which are at the top of the hierarchy and encompass all the data within the Yahoo database. The client can select one of these broad categories of interest such as recreation. In response, Yahoo presents several subcategories of recreation such as aviation, animals, amusements, games and sports. Then, the client selects one of the subcategories such as games, and in response, Yahoo presents several sub-subcategories such as air hockey, billiards etc. Each category (top, sub, sub—sub, etc.) in the hierarchy includes hot links for associated web pages. Naturally, as the hierarchy is traversed further and further downwardly, the associated web pages become more and more specific. The disadvantage of a hierarchical search is the time and skill required to navigate through the hierarchy, but this is compensated by the relevance of the ultimate web page selections.

Various program tools are available today to facilitate the process of identifying new data of interest to a user. For example, an IBM Web Browser Intelligence tool is executed on the client computer and keeps track of which URLs/web pages the user previously accessed. The user can request to see any recent changes to these URLs/web pages. In response, the tool monitors these particular URLs for changes and notifies the user.

While the foregoing tools are effective in identifying some new data of interest to the user, further improvements are desirable to identify other new data of interest to the user.

Accordingly, a general object of the present invention is to provide a computer system which identifies additional and more relevant data of interest to the user than the foregoing tools.

SUMMARY OF THE INVENTION

The invention resides in a computer system for identifying web pages of interest to a client. The system comprises a cataloging function which defines a hierarchy of subject categories, logically arranges a multitude of web pages in the categories and periodically adds web pages to the categories. The system also comprises a profile building function which receives selections of categories from a user, records the selections and responds with an identification of subcategories of each selected category. The user can make further selections from the subcategories. Alternately, the user makes a key word search and then selects data web pages from the results of the search. The profile building function also records the categories of the data web pages selected by the user. Next, the user requests a list of recently added web pages of interest to the user. In response, the system identifies recently added web pages from the categories previously selected by the user and from the categories of the data web pages previously selected by the user. Thus, the recently added web pages of interest are identified to the user.

BRIEF DESCRIPTION OF THE FIGURES

FIG. 3 illustrates a record made by the profile building function of FIG. 2 of new data web pages added by the cataloging function on a daily basis.

FIG. 9 illustrates the result of processing the request of FIG. 8 to identify new web pages of interest to the user.

DETAILED DESCRIPTION OF THE PREFERRED EMBODIMENTS

Figure 2:
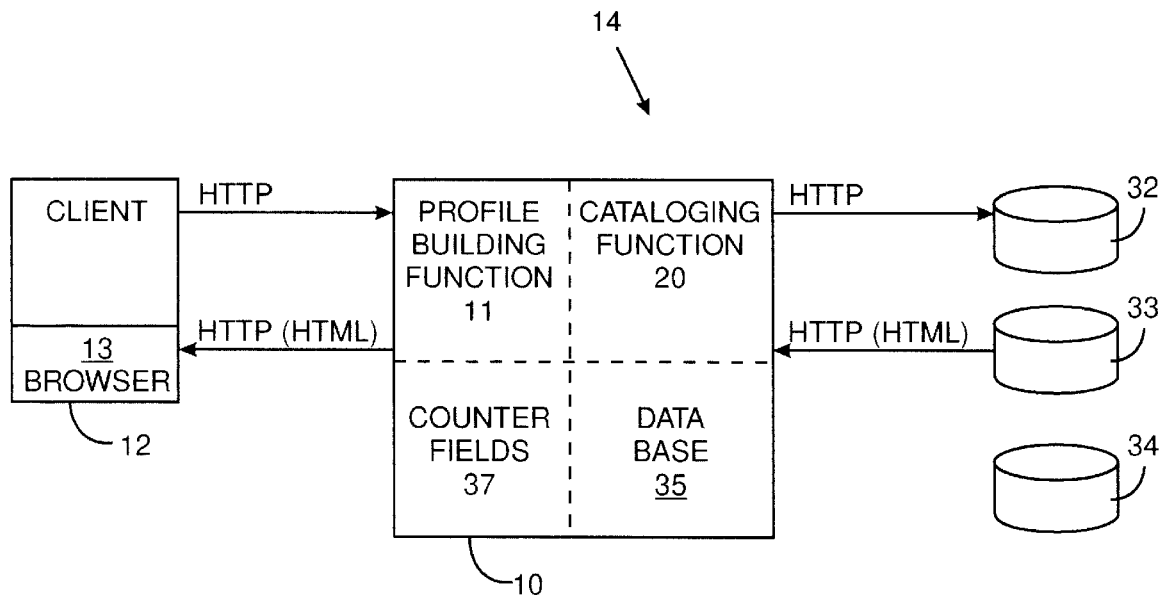
FIG. 2 is a block diagram illustrating a client and a server including a profile building function according to the present invention.

Referring now to the drawings in detail wherein like reference numbers indicate like elements throughout, FIG. 2 illustrates a server generally designated 10 according to the present invention. Server 10 includes a profile building function 11 and a cataloging function 20 and resides on the WWW 14. The cataloging function 20 can access databases 32–34 and the data may be stored as web pages. By way of example, the cataloging function is similar to an existing Yahoo (tm) server.

In the illustrated example, the client 12 communicates with the server 10 using the http access method and receives html from server 10 embedded in the http communication. The html defines the composition of each entry on the web page and the nature of the entry—text, graphics and/or hot link. A client web browser 13 converts the html data to a display of the web page.

The cataloging function 20 within server 10 periodically, for example daily, accesses databases 32–34 to build a database 35 of new data entries. Each new data entry comprises a respective URL, descriptive material such as the topic of the web page within the topic hierarchy, title or first paragraph of text of the web page and a date stamp. FIG. 3 illustrates daily additions to the database 35 by the cataloging function. In the illustrated example, on August 1, there were two new data entries in the recreation category, four new data entries in the business category and three new data entries in the sports category. (The nomenclature for each entry in the table of FIG. 3 is illustrated for explanatory purposes. The first two characters designate the category, the next number designates the day in August that the entry was added to the cataloging function and the last number designates the sequence number of the entry that day.) To conserve storage within server 10, server 10 purges much older data entries, for example, those older than two weeks. Thereafter, server 10 uses database 35 to furnish data that is subsequently requested by the client.

Figure 4A:
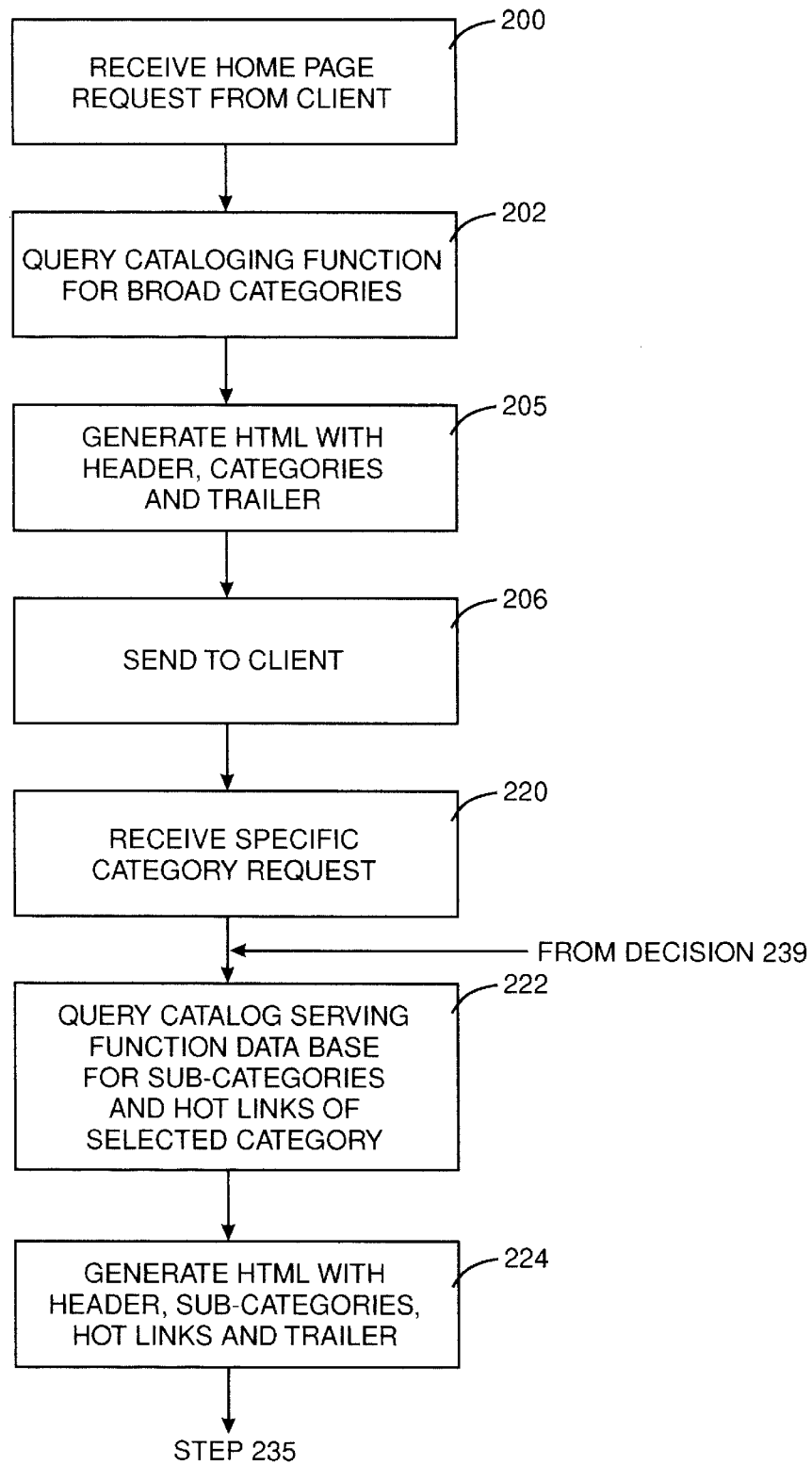
FIGS. 4(a, b) form a flow chart illustrating processing by the profile building function of FIG. 2 as a user navigates through the hierarchy of FIG. 1 and selects data web pages listed in the hierarchy.
Figure 4B:
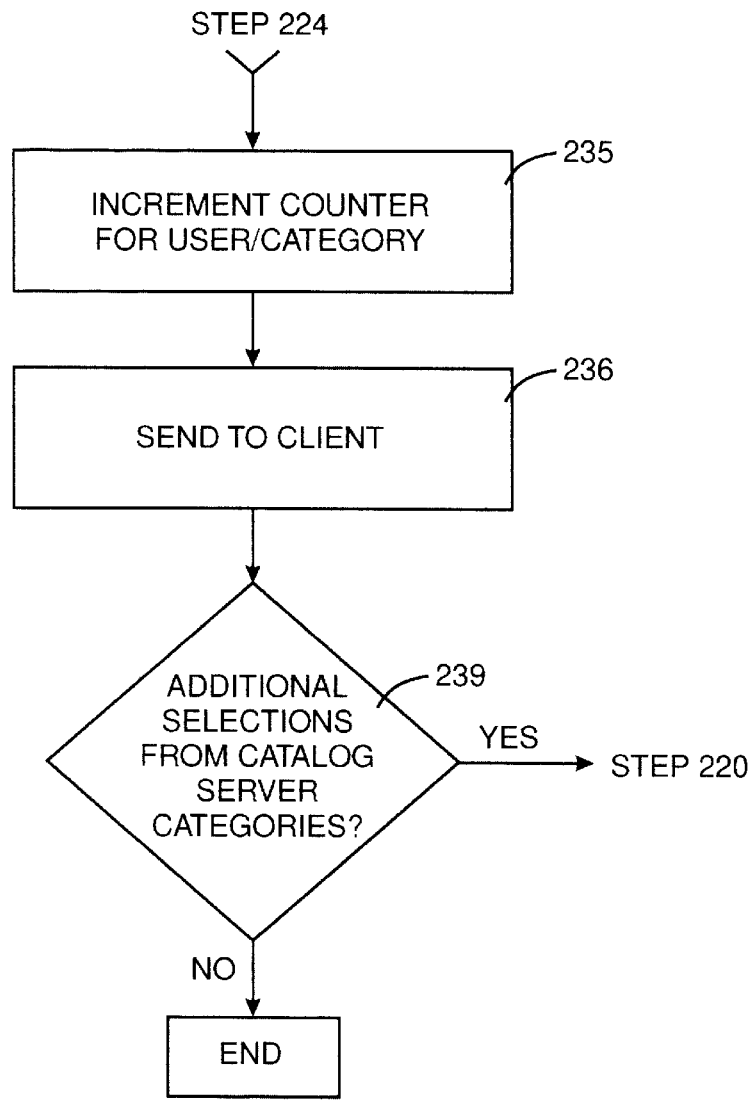

FIGS. 4(a, b) illustrate processing by profile building function 11 when a user "surfs the net" hierarchically, i.e. navigates through the hierarchy of categories provided by cataloging function 20 and ultimately selects data web pages. Client 12 begins the session by requesting the home page of server 10 (step 200). The profile building function 11 receives the client request and queries the cataloging function 20 for the broad categories of the first level in the hierarchy (step 202). Then, the profile building function 11 generates home page 203 illustrated in FIG. 5 (step 205) and sends the home page to the client (step 206). The home page comprises a header 203, trailer 204 and cataloging form 209 therebetween. Cataloging form 209 resembles the Yahoo (tm) home page. The header 203 advises the user that his or her subsequent category selections will be recorded to build a user profile. The trailer 204 comprises links to URLs not related to the topic hierarchy, such as help, feedback to the server owners, etc. The cataloging form supports both hierarchical and key word searching, and lists the broad categories 42—recreation, arts, business, science, education . . . obtained from the cataloging function. Each of the categories includes a hot link which addresses server 10, and other hot links which directly address data web pages by URL (bypassing server 10).

Figure 1:
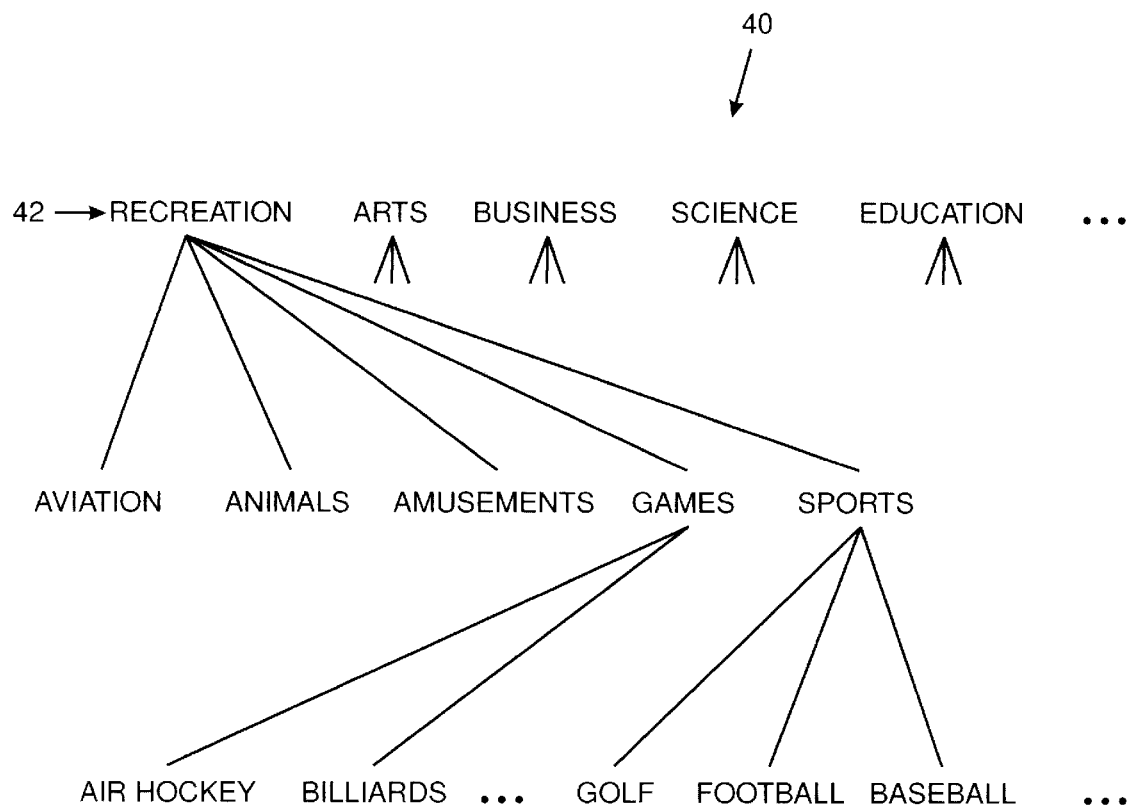
FIG. 1 illustrates a hierarchical arrangement of categories provided by a cataloging function according to the prior art.

In the illustrated example, the user next selects one of the broad categories from cataloging form 209, for example, the "recreation" category. This request is sent to the profile building function 11 within server 10 (step 220), and function 11 then requests from the catalog serving function 20 the subcategories emanating from the selected broad category (step 222). The profile building function 11 then generates the corresponding web page which includes header 203, trailer 204 and a cataloging form similar to 209 except that the subcategories of the selected broad category are displayed instead of the broad categories (step 224). In the foregoing example, where the user selected main category "recreation", the responsive cataloging form includes the subcategories "aviation", "animals", "amusements", "games" and "sports" as illustrated in FIG. 1.

In accordance with the present invention, because the current selection is a category in the hierarchy (and not a data web page), the profiling building function 11 records that this particular user has selected this particular category (step 235). If this is the first time that this user has selected this category, then server 10 defines a counter field 27a within the user's profile (FIG. 6) for this user/category combination and increments the counter to one to represent the first time that this user has selected this particular category. If this particular user selected this particular category before (as illustrated eight times before for the Recreation category), then the profile building function 11 increments the assigned counter field. As further illustrated by FIG. 6, there is a separate counter field 27*b,c,d* etc. for each combination of user/category previously accessed by the user and the number stored in the field indicates the number of times that the particular user has selected the particular category. In the example illustrated in FIG. 6, the user has now selected the recreation category nine times, the business category once, the games category once, the billiards category once etc. Next, server 10 passes the html for the current screen, including the subcategories of Recreation, back to client 12 (step 236).

Typically, the client will proceed further down the hierarchy by a repetition of selections from the current web page (decision 239) in which case, the processing loops back to step 220. Each time the client is furnished with the corresponding cataloging form comprising hot links to a list of subcategories and hot links to data web pages. However, at any category in the hierarchy which includes a hot link to a data web page, the client can also select the hot link to the data web page (client step 241). Each such hot link includes the URL of the respective data web page and not the URL of the server 10. Therefore, the client 12 obtains the data web page directly from the source of the URL without involving server 10, i.e. server 10 is not aware of and does not participate in client step 241.

Figure 7:
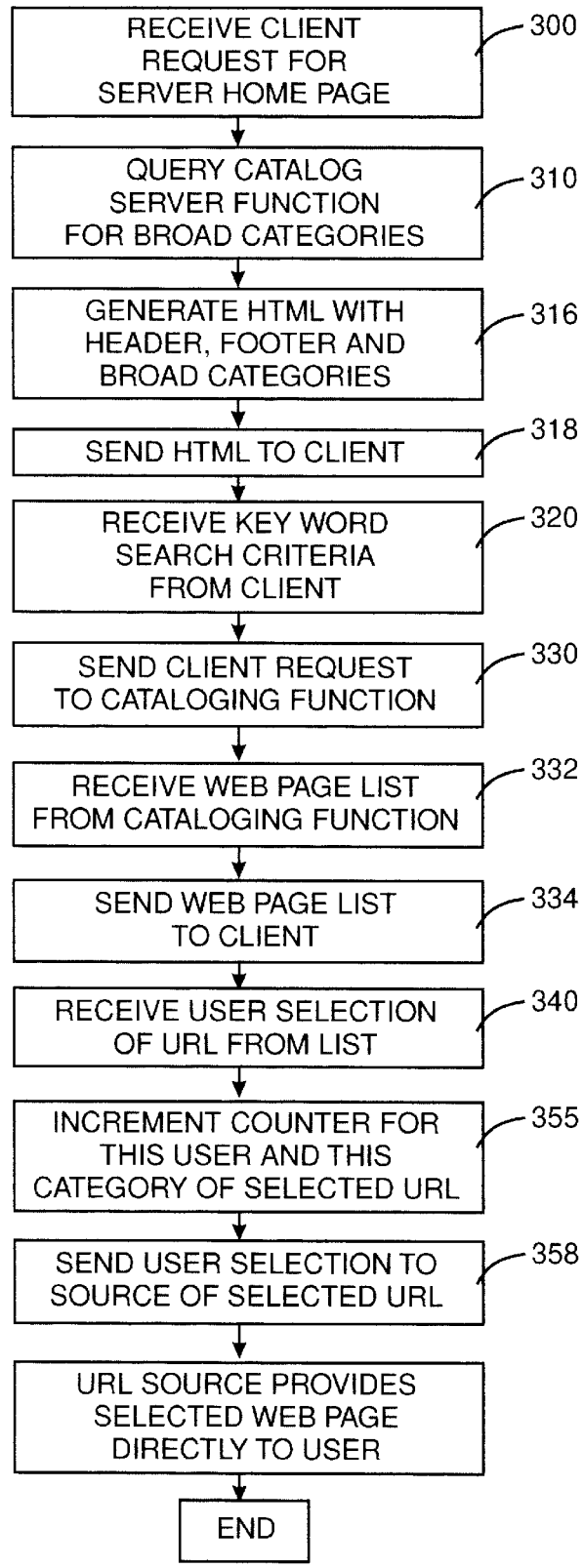
FIG. 7 is a flow chart illustrating processing by the profile building function of FIG. 2 as a user performs a key word search and selects data web pages resulting from the key word search.

FIG. 7 illustrates processing by profile building function 11 when a user "surfs the net" by a key word search. This may be done instead of or in addition to the hierarchical navigation described above. In the illustrated embodiment, the key word search also utilizes cataloging function 20, but alternately could use a different key-word search engine provided the engine assigns a category to each data web page and is periodically updated with new data web pages. In the illustrated example, client 12 addresses the home page of server 10 (step 300). As described above, the profile building function 11 receives the client request and queries the cataloging function 20 for the broad categories of the first level in the hierarchy (step 310). Then, the profile building function generates the home page illustrated in FIG. 5 (step 316) and sends the home page to the client (step 318). The home page comprises header 203, trailer 204 and cataloging form 209 therebetween. As noted above, the cataloging form supports both hierarchical and key word searching, and includes a field 317 for the user to define a key word search. The field 317 is hot linked to server 10. Next, the client defines the key word search and the key word search request is sent to the profile building function of server 10 (step 320). In response, the profile building function passes the key word search request to the cataloging function 20 (step 330) and cataloging function 20 performs the search and passes the results of the key word search back to the profile building function 11 (step 332). These results include a list of titles of the data web pages which include the key word, a hot link from each title to server 10 and the category of each of the data web pages referenced by the hot links. Then, profile building function adds the header and footer to the results and sends the html to client 12 (step 334).

Next, the user selects one of the hot links in the list for a data web page and the selection is sent to the profile building function of server 10 (step 340). In accordance with the present invention, profile building function 11 records that this particular user has requested a web page in the respective category and increments the respective counter field representing this combination of user and category (step 355). Next, in the preferred embodiment of the present invention, the profile building function requests the URL selected by the user (step to 358). However, the profile building function indicates client 12 as the source of the request. Consequently, the selected data web page will be sent directly to the client 12 (bypassing server 10), and the user can make further selections from hot links on this web page. However in the preferred embodiment of the present invention, neither the selections from these subsequent hot links nor the respective categories are recorded by profile building function 11 because server 10 is no longer in the loop. (However, if desired in another embodiment of the present invention, when the profile building function 11 receives each selection of a hot link for a data web page from the user, profile building function 11 could pass the selection to the source but indicate server 10 as the requester. Then, when the profile building function receives the responsive web page, the profile building function could include its own address in the hot links. Consequently, all client selections and responsive web pages would pass through server 10. In this manner, profile building function 11 would be able to record all categories selected by client 12 for all selected data web pages.)

Figure 8:
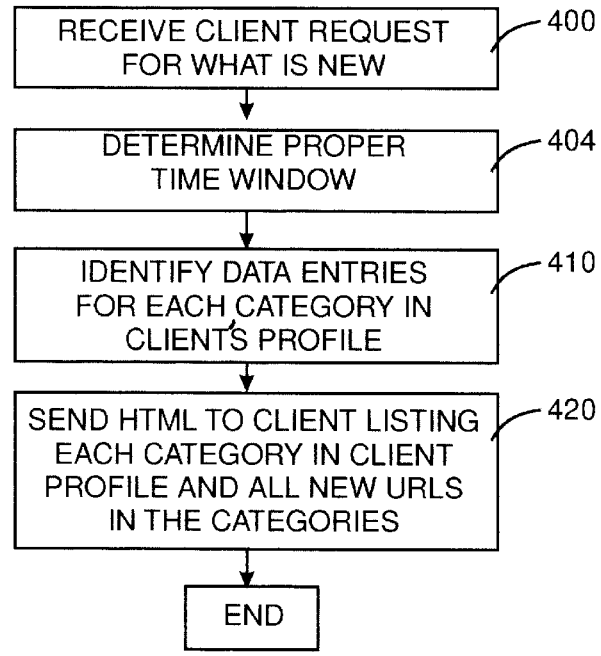
FIG. 8 is a flow chart illustrating processing by the profile building function of FIG. 2 resulting from a user request to identify new data web pages of interest to the user.

FIG. 8 illustrates processing of a user request to identify new web pages of interest to the user. After the client makes a request for "what is new" (step 400), profile building function 11 determines the appropriate time frame, either the default time frame of two weeks or a client specified time frame, both extending back from the present date (step 404). (However, if desired, the appropriate time frame can be limited by the date of last access by the user to each of the categories. For example, if the appropriate time frame is two weeks, and the user accessed category "games" ten days ago and category "billiards" one week ago, then new web pages for only the last ten days under the category "games" will be provided but new web pages for only the last week under the category "billiards" will be provided.) After step 404, the profile building function 11 determines from the counter fields of FIG. 6 all categories of interest to the user and then fetches all the new data entries for those categories from the database 35 illustrated in FIG. 3, in the appropriate time frame (step 410). In the illustrated example, the appropriate time frame is three days, from August first through August third. Previously, the user accessed the recreation, business, games, sports, billiards, golf and baseball categories from August first through August third and counts have been added to the user's profile. There are four new URLs for recreation, four new URLs for business, six new URLs for sports, one new URL for games and two new URLs for golf. Even though the user selected the baseball and billiards categories, there were no new URLs for either baseball or billiards during these three days and therefore no new data entries to present to the user. There are also other categories containing new entries in FIG. 3 for these three days, such as education and aviation, but the user never selected the education or aviation categories and so will not be presented with the new data entries from the education or aviation categories. The order in which the categories are presented to the user depends on the number of times that this user has selected the category. The listings for the category which the client has selected most often in the past are listed first. The resultant screen data illustrated in FIG. 9 is sent to the client (step 420). In the illustrated example, the new entries from the "recreation" category are listed first, the new entries from the "sports" category are listed second, the new entries from the "golf" category are listed third, and the new entries from the remaining two categories "games" and "business" are listed in random order because these categories were both selected once by client 12. All of the date entries in FIG. 9 include hot links to the corresponding data web page. Finally, the client can select any of the data entries in any of the categories, and thereby request the corresponding data web page directly from the source of the web pages, bypassing server 10. The source returns the selected web page to the client bypassing server 10.

Figure 10:
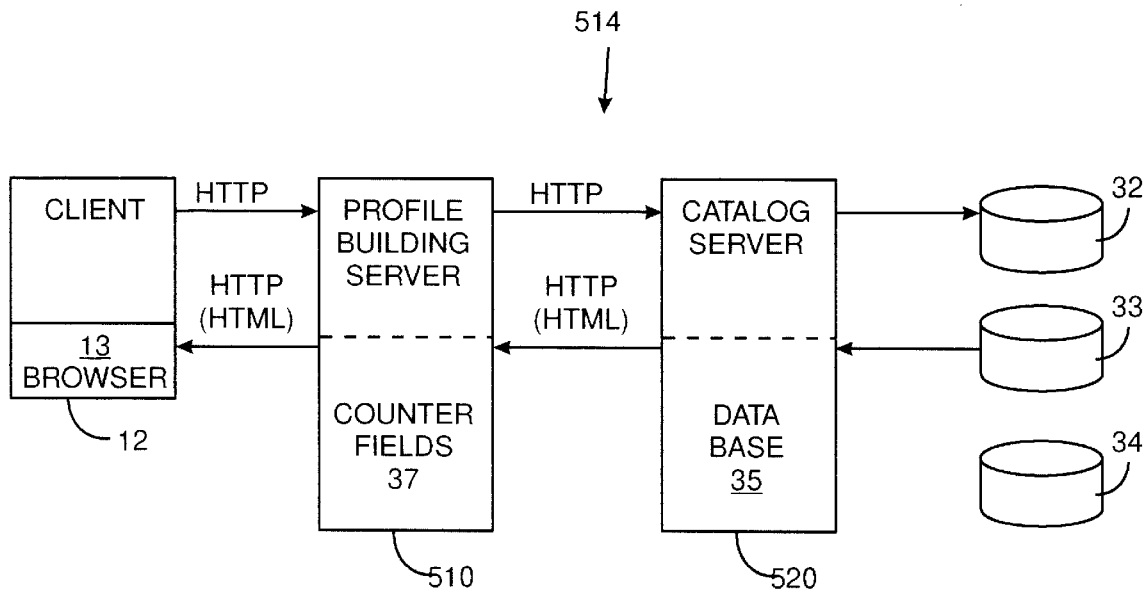
FIG. 10 is a block diagram illustrating a client and a server including a profile building function according to another embodiment of the present invention.

FIG. 10 illustrates another embodiment of a computer network generally designated 514 according to the present invention. Network 514 comprises a profile building server 510 and a separate catalog server 520. Profile building server 510 is interposed between client 12 and catalog server 520 as part of the WWW 514. The catalog server 520 can acess databases 32–34 and the data may be stored as web pages. By way of example, the catalog server 520 is an existing Yahoo (tm) server.

In the illustrated example, the client 12 communicates with the server 510 in both directions using an http access method and receives html from server 510 embedded in the http communication.

The html defines the composition of each entry on the web page and the nature of the entry—text, graphics or hot link. The client browser 13 converts the html to a display of the web page.

Server 510 communicates with server 520 in both directions using http access method and receives html from catalog server 520 embedded in the http communication. Catalog server 520 periodically, for example daily, accesses databases 32–34 to build its own database 35, and uses its own database 35 to furnish the htmls to the profile building server 510. When profile building server 510 sends web pages to client 12 and wants to remain in the loop, profile building server 510 alters the hot link addresses of the web pages to the address of profile building server 510. Consequently, when the client 12 selects one of these hot links, the request will first go to profile building server 510 which will record the request as described below. Then the profile building server will forward the request to the source of the URL intended by the client.

Figure 11:
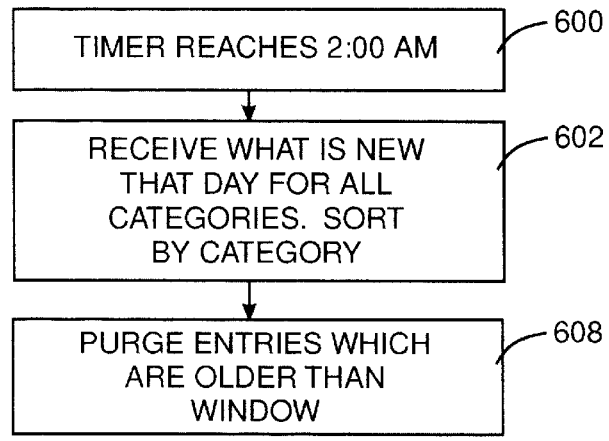
FIG. 11 is a flow chart illustrating processing by the profile building function of FIG. 10 to record new data web pages added by the cataloging function on a daily basis.

The flow chart of FIG. 11 illustrates automatic operations performed by profile building server 510. Once each day, for example, at 2:00 AM (decision 600), profile building server 510 sends a request to the catalog server 520 for data entries for all new URLs/web pages added that day to the catalog server's database 35 (and hierarchy). Each data entry includes a respective URL, descriptive information for the URL such as its title or first paragraph, and the category in which the new URL falls. Catalog server 520 returns the data entries to profile building server 510 which stores the data entries with a date stamp for each (step 602). Profile building server 510 stores the data entries grouped by category. To conserve storage within profile building server 510, server 510 also purges much older data entries, for example, those older than two weeks (step 608). Thus, server 510 maintains a running database of URLs added each day to the category server 520's database for the last two weeks.

The entries in the database are the same as that illustrated in FIG. 3.

Figure 5:
FIG. 5 illustrates a web page presented to the user to permit the user to navigate through the hierarchy of FIG. 1 according to the flow chart of FIGS. 4(a, b).
Figure 12A:
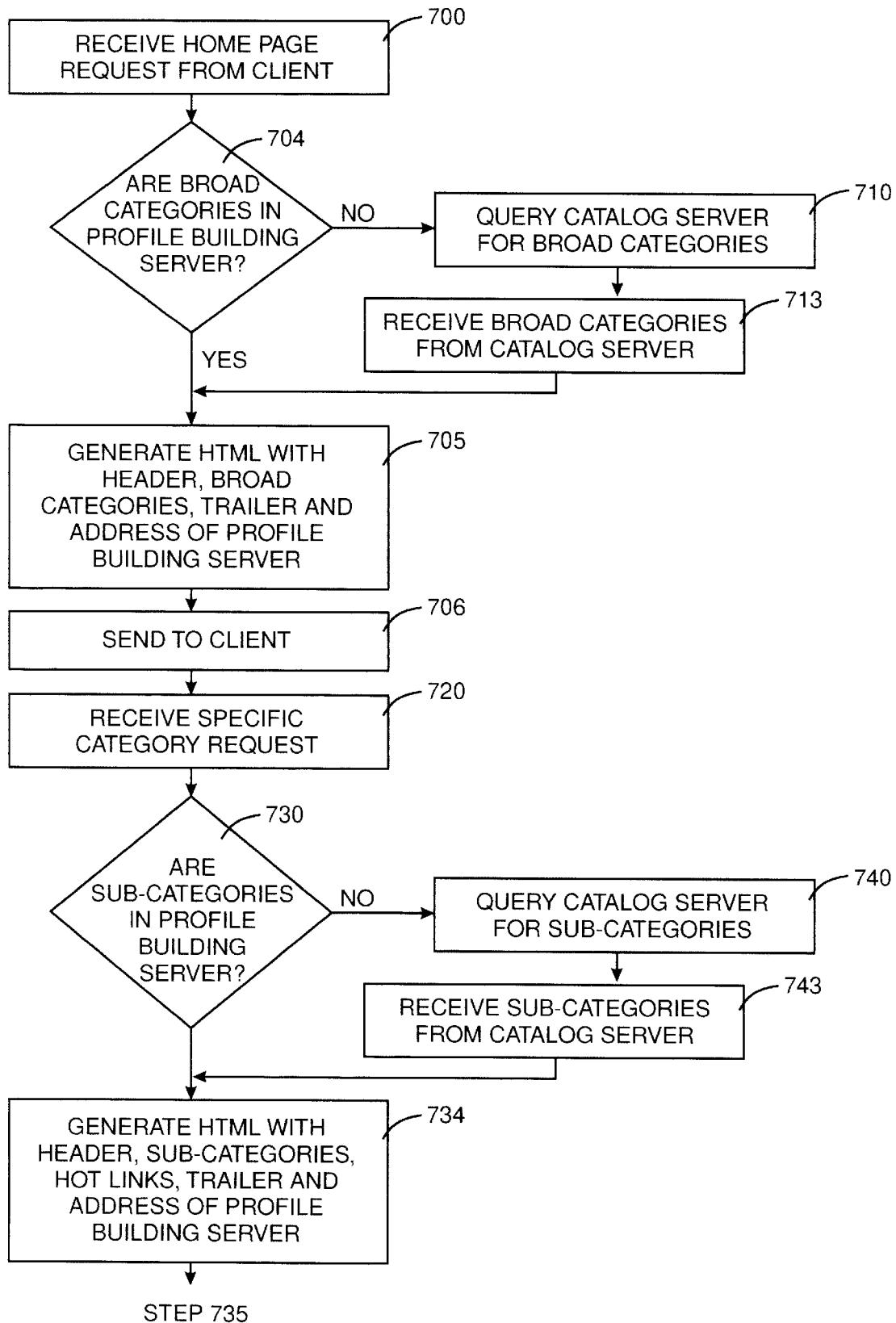
FIGS. 12(a, b) form a flow chart illustrating processing by the profile building function of FIG. 10 as a user navigates through the hierarchy of FIG. 1 and selects data web pages listed in the hierarchy.
Figure 12B:
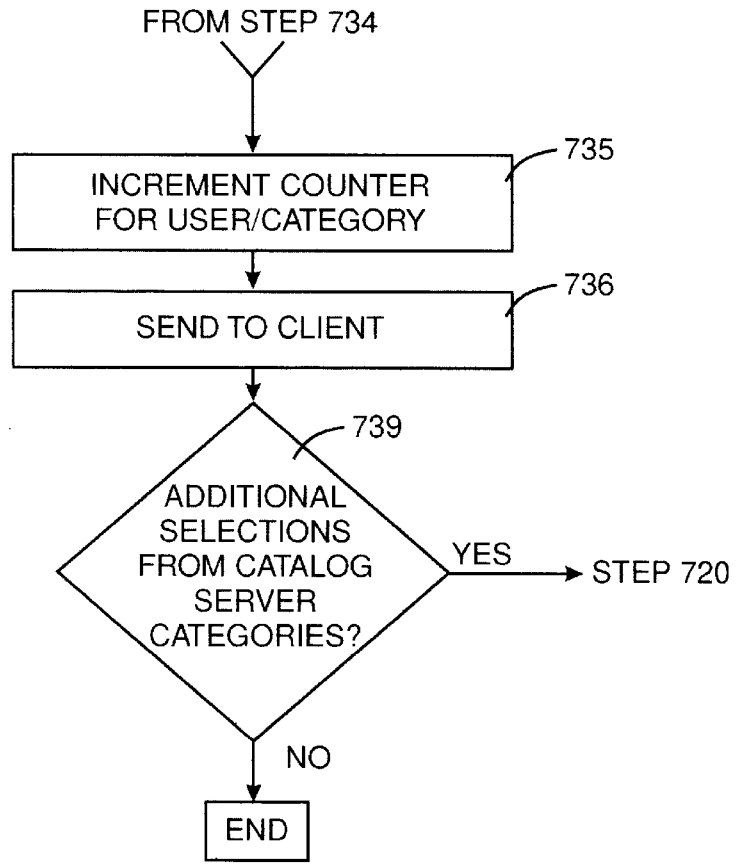

FIGS. 12(a, b) illustrate a client session for hierarchically "surfing the net", i.e. navigating through the hierarchy of categories provided by catalog server 520. Initially, client 12 requests the home page of server 510 (step 700). To generate this home page, server 510 needs the broad categories—Recreation, Arts, Business, Science, Education . . . of the catalog server hierarchy illustrated in FIG. 1. Profile building server 510 may already have the broad categories (based on a recent request to the catalog server) (decision 704). If so, then profile building server 510 changes the address of every hot link of the broad categories to the address of profile building server 510, and adds header 203 and trailer 204 to the html as illustrated in FIG. 5 (except the URL references server 510 instead of server 520) (step 705). Then, profile building server 510 passes the html for the resultant home page back to client 12 (step 706). As illustrated in FIG. 5, this home page includes the broad categories as well as a key word search field definition 317. As described in more detail below with reference to FIG. 13, the client also has the option to conduct a key word search at this time.

Referring back to decision 704, if server 510 did not have the broad categories required for the server 510 home page when originally requested by client 12, then profile building server 510 requests the broad categories from catalog server 520 (step 710). Catalog server 520 duly returns the broad categories (step 713) and profile building server 510 performs steps 705 and 706 as described above.

Next, the client user selects one of the broad categories/ hot links from the home page of the profile building server, for example, the "recreation" category in the home page. The request is sent to profile building server 510 (step 720) which determines if server 510 currently stores the respective subcategories (decision 730). In the illustrated example, the subcategories emanating from the selected recreation category are Aviation, Animals, Amusements, Games and Sports. If server 510 currently stores these subcategories, then server 510 changes the addresses of all subcategory hot links to the address of server 510 and adds header 203 and trailer 204 to the screen form (step 734). Also, in accordance with the present invention, because the current selection is a category in the hierarchy (and not a data web page), server 510 records that this particular user has selected this particular category (step 735). If this is the first time that this user has selected this particular category, then server 510 defines counter field 27a (FIG. 6) for this user/category combination and increments the counter to one to represent the first time that this user has selected this particular category. If this particular user selected this particular category before, then the profile building server 510 increments the assigned counter field. As further illustrated by FIG. 6, there is a separate counter field 27b,c,d etc. for each combination of user/category and the number stored in the field indicates the number of times that the particular user has selected the particular category. Next, server 510 passes the html for the current screen of subcategories back to client 12 (step 736).

Referring back to decision 730, if server 510 did not have the subcategories for the selected category when originally requested by client 12, then server 510 requests the subcategories from catalog server 520 (step 740). In response, the catalog server 520 returns the subcategories (step 743), and then server 510 executes steps 734–736 as described above.

Typically, the user will proceed further down the hierarchy by a repetition of selections from the subcategories (decision 739) and repetition of steps 720, 730, 734, 736, 740 and 743 as described above, and each time the user selects another subcategory, the counter field for the particular user/category combination is incremented. However, at any category in the hierarchy which includes a hot link to a data web page, the user can select the hot link (client step 741). Each such hot link includes the original URL of the respective data web page and not the server 510 address. Therefore, the client 12 obtains the data web page directly from the source of the URL without involving server 510.

(Profile building server 510 is not aware of and does not participate in client step 741).

Figure 13A:
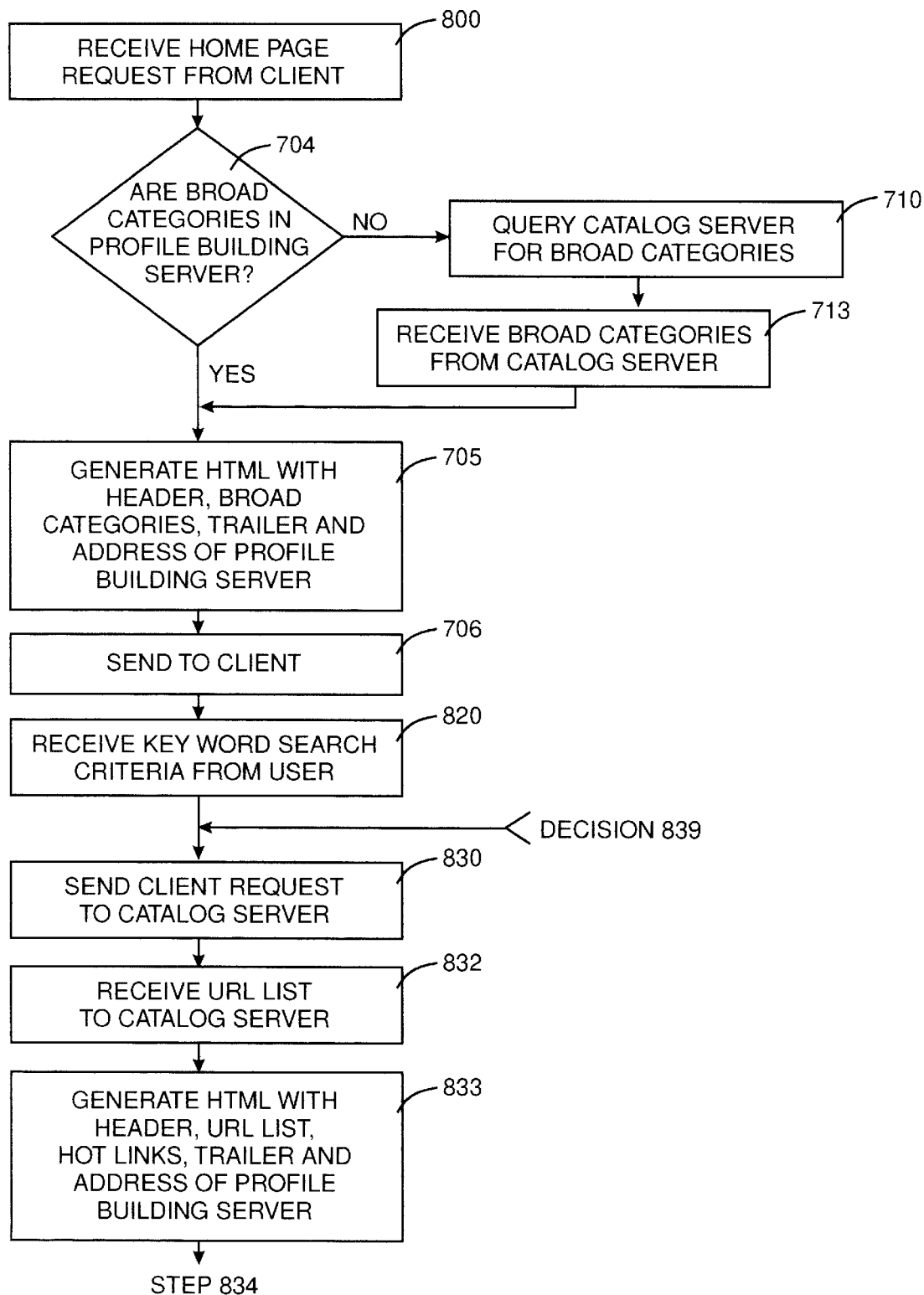
FIGS. 13(a, b) form a flow chart illustrating processing by the profile building function of FIG. 10 as a user performs a key word search and selects data web pages resulting from the key word search.
Figure 13B:
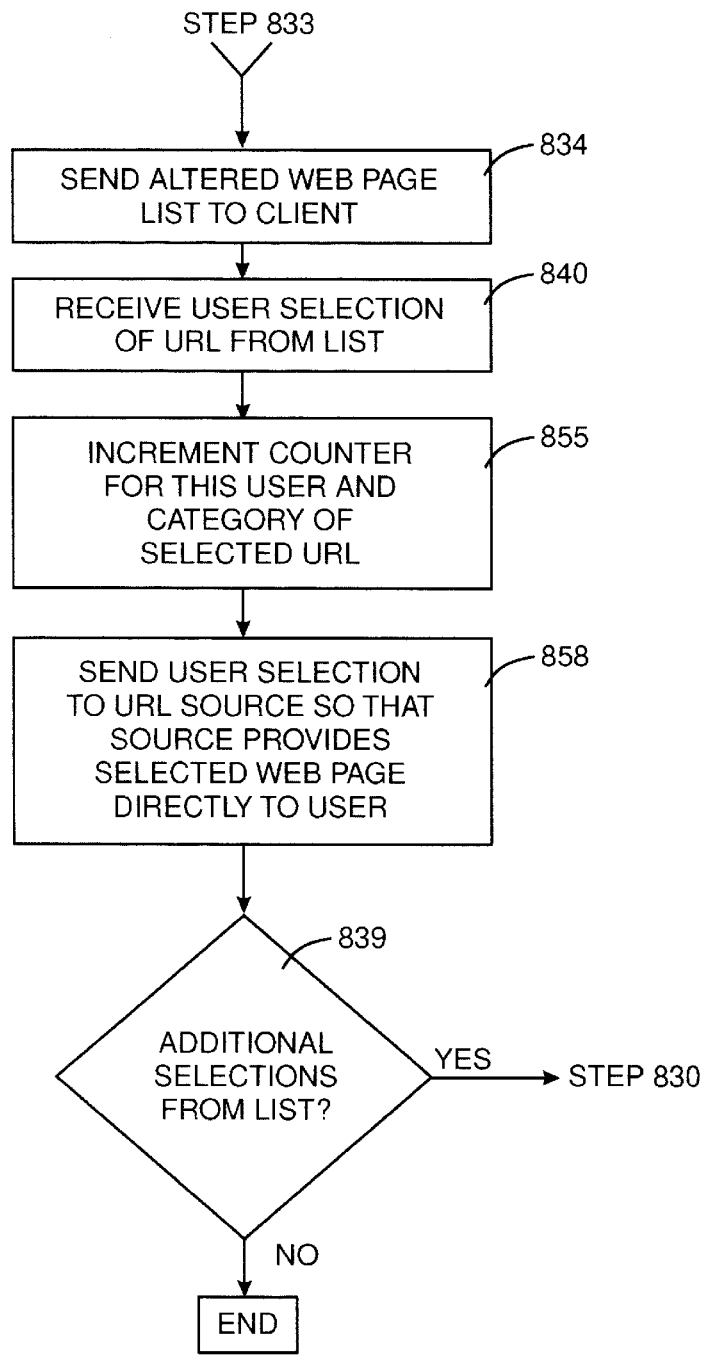

FIGS. 13(*a, b*) illustrate a client session for "surfing the net" by a key word search. This may be done instead of or in addition to the hierarchical navigation described above. In the illustrated embodiment, the key word search also utilizes catalog server 520, but could use a different key-word search engine provided the engine assigns a category to each data web page and will furnish all the new web pages daily or weekly to profile building server 510 upon request. In the illustrated example, client 12 requests the home page of profile building server 510 (step 800). In response, server 510 executes decision 704 and then step 705 or steps 710 and 713 and then step 706 as described above to generate the home page of server 510 as illustrated in FIG. 5 and return it to the client. Next, client 12 defines the key word search (step 820). The key word definition field 37 is hot linked to profile building server 510, and server 510 forwards the key word search request to catalog server 520 (step 830) and indicates that profile building server is the requester. Consequently, catalog server 520 sends the results of the key word search back to the server 510 (step 832). These results include a list of titles of the data web pages which include the key word and the category of each of the data web pages referenced by the respective title. Then, profile building server 10 adds a hot link for each title to reference profile building server 510 and adds the header and footer (step 834), and sends the html to client 12 (step 834).

Figure 6:
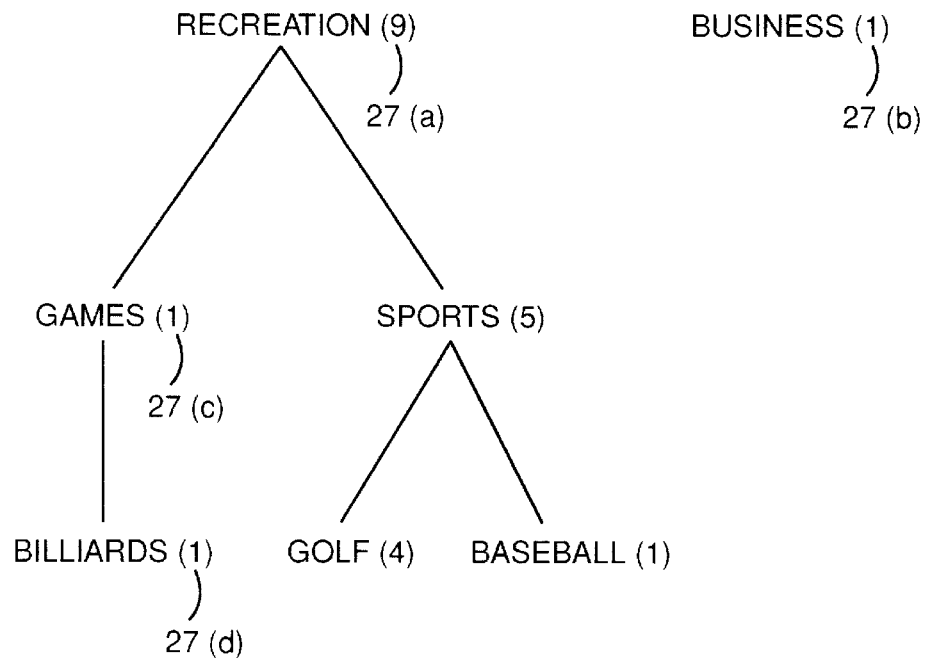
FIG. 6 illustrates a record made by the profile building function of FIG. 2 of category selections made by the user during the processing illustrated in FIGS. 4(a, b).

Next, the client selects one of the hot links in the list. The selected hot link references profile building server 510 (step 840). In accordance with the present invention, profile building server 510 records that this particular user has requested a URL/web page in the respective category and increments the counter field 237 representing this combination of user and category (step 855). Such counter fields are illustrated in FIG. 6. Next, in the preferred embodiment of the present invention, profile building server 510 sends the client selection to the source of the selected URL/web page (step 858) and indicates the client 12 as the requester. Consequently, the selected web page is sent directly back to the client 12 (bypassing server 510 and server 520), and the client can make further selections from hot links on this web page. However in the preferred embodiment of the present invention, neither the selections from these subsequent hot links nor the respective categories are recorded by profile building server 510 because to server 510 is no longer in the loop. (However, if desired in another embodiment of the present invention, when the server 510 receives each selection of a hot link for a data web page from the client, the server 510 could indicate that server 510 is the requester when forwarding the request to the source of selected data web page. The server 510 would also include the server 510 address in all hot links sent to client 12. Consequently, all client selections and responsive web pages would pass through server 510. In this manner, server 510 would be able to record all categories selected by client 12 for all selected data web pages.)

FIG. 8 illustrates processing of a user request to profile building server 510 to identify new web pages of interest to the user. Steps 400, 404, 410 and 420 were described above and explain processing of profile building server 510. The resultant screen data illustrated in FIG. 9 is sent to the client (step 420). Finally, the client can select any of the listings in any of the categories, and thereby request the corresponding data web page directly from the source of the web pages, bypassing server 510 and server 520. The source returns the selected web page to client 12 bypassing server 510 and server 520.

Figure 14:
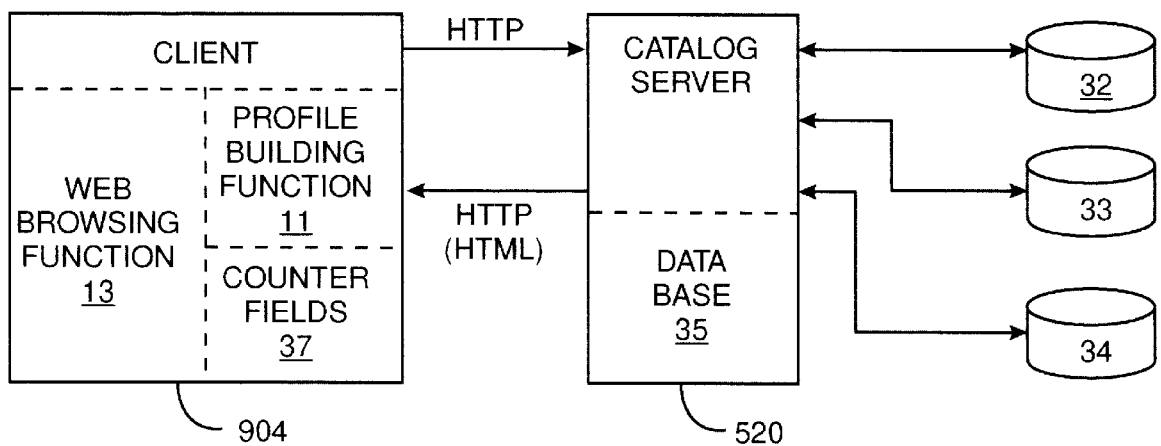
FIG. 14 is a block diagram illustrating a client and a server including a profile building function according to yet another embodiment of the present invention.

FIG. 14 illustrates another embodiment of the present invention in which profile building function 11 of server 10 is merged with the client web browsing program function 13 into an enhanced client computer 904. The inclusion of the profile building function in the same computer as the web browsing function reduces network traffic as compared to the networks illustrated in FIGS. 2 and 10. The operation of the profile building function and web browsing function is similar to that illustrated in FIG. 10 except that communications between the web browsing function 13 and the profile building function 11 are by simple program calls instead of http.

Figure 15:
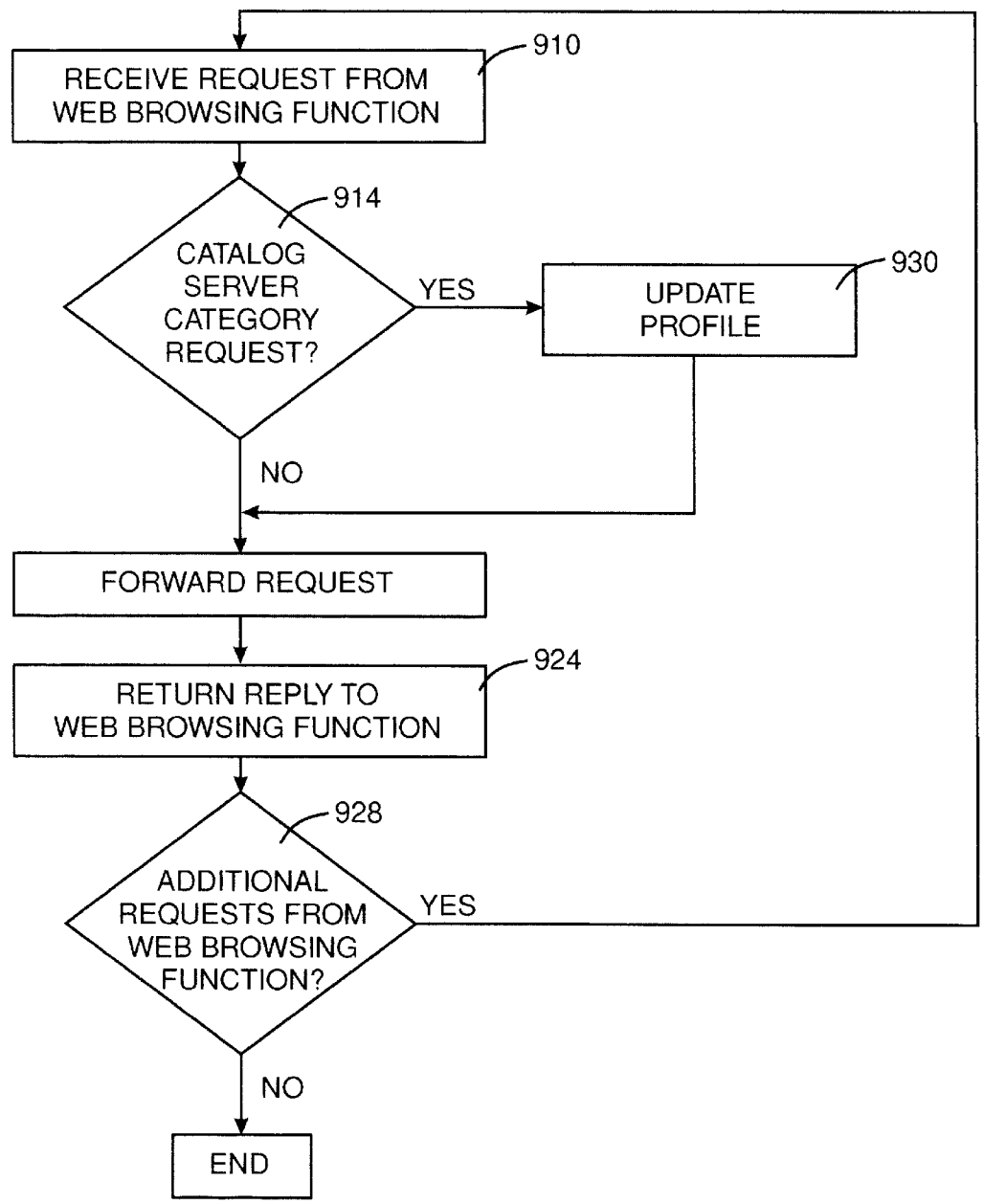
FIG. 15 is a flow chart illustrating processing by the profile building function of FIG. 14 as a user navigates through the hierarchy of FIG. 1 and selects data web pages listed in the hierarchy.

FIGS. 1–3 are applicable for the embodiment of FIG. 14. FIG. 15 illustrates processing by the profile building function 11 within client 904. In step 910, the profile building function receives a request from the web browsing function, for example, a request for the home page of the catalog server 520. In response, the profile building function determines that the user has not yet specified a particular category (decision 914), so forwards the request to the catalog server 520 (step 920). Next, the profile building function receives the html from the catalog server and passes the html to the web browsing function (step 924). The web browsing function then displays the home page as illustrated in FIG. 5. The user may next select one of the broad categories from the home page (decision 928 and step 910). In response, the profile building function updates the user's profile to indicate that this user has requested the selected broad category (decision 914 and step 930). The user's profile is illustrated in FIG. 6. The foregoing process is repeated for each user selection from the hierarchy of categories. Finally, the user selects a data web page and this request is forwarded to the respective server (step 920) and returned to the web browser function (step 924) without update to the profile building function.

Figure 16A:
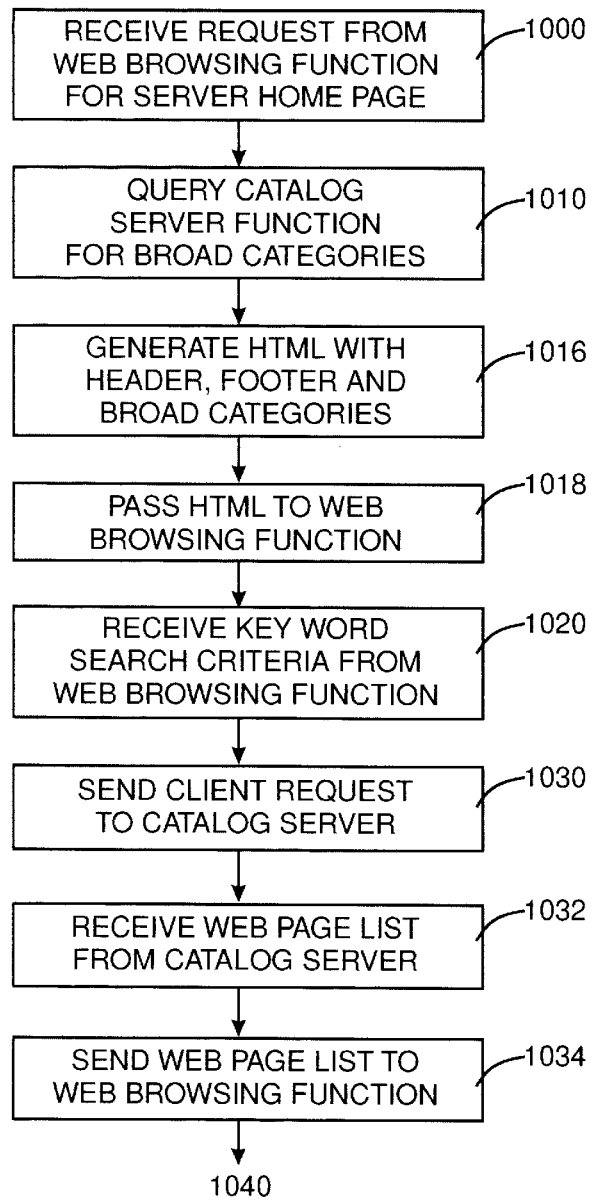
FIGS. 16(a, b) form a flow chart illustrating processing by the profile building function of FIG. 14 as a user performs a key word search and selects data web pages resulting from the key word search.
Figure 16B:
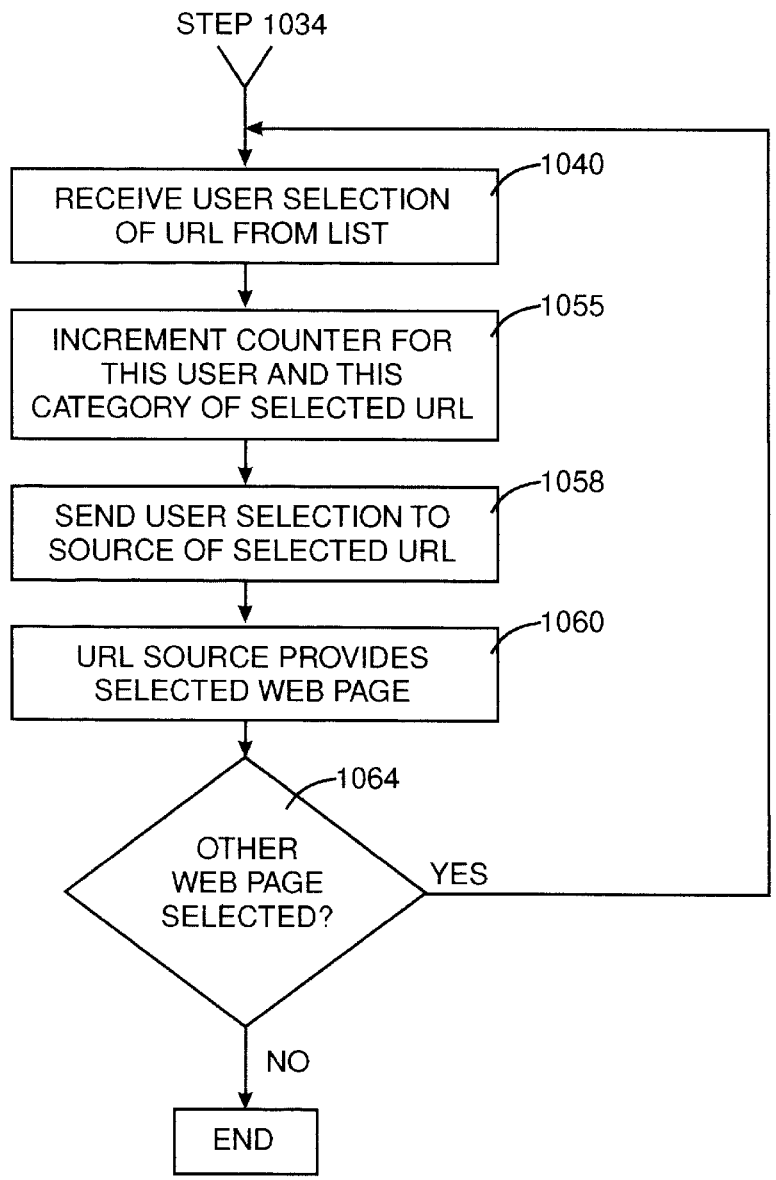

FIG. 16 illustrates processing of a key word search request. This may be done instead of or in addition to the hierarchical navigation described above. In the illustrated embodiment, the key word search also utilizes catalog server 520, but alternately could use a different key-word search engine provided the search engine assigns a category to each data web page and is periodically updated with new data web pages. In the illustrated example, the web browsing function 13 addresses the home page of server 520 (step 1000). As described above, the profile building function 11 receives the user request via the web browsing function and queries the catalog server 520 for the broad categories of the first level in the hierarchy (step 1010). Then, the profile building function generates the home page illustrated in FIG. 5 (step 1016) and passes the home page to the web browsing function (step 1018). The home page comprises header 203, trailer 204 and cataloging form 209 therebetween. As noted above, the cataloging form supports both hierarchical and key word searching, and includes a field 317 for the user to define a key word search. The field 317 is hot linked to server 10. Next, the user defines the key word search and the key word search request is sent via the web browsing function to the profile building function (step 1020). In response, the profile building function sends the key word search request to the catalog server (step 1030) and the catalog server performs the search and sends the results of the key word search back to the profile building function 11 (step 1032). These results include a list of titles of the data web pages which include the key word, a hot link from each title to the respective server and the category of each of the data web pages referenced by the hot links. Then, profile building function adds the header and footer to the results and sends the html to the user via the web browsing function (step 1034).

Next, the user selects one of the hot links in the list for a data web page and the selection is passed via the web browser function to the profile building function (step 1040). In accordance with the present invention, profile building function 11 records that this particular user has requested a web page in the respective category and increments the respective counter field representing this combination of user and category (step 1055). Next, the profile building function requests the URL selected by the user (step 1058) and indicates that client 904 is the requester. In response, the URL is loaded from the server responsible for the URL to client 904, bypassing catalog server 520 (step 1060). Then, the web browsing function displays the web page. If the user makes additional web page selections from the key word search, then steps 1058–1062 are repeated to load the web page to the client. (However, if desired, the profile building function can update the user profile for each additional selection by means of step 1055.)

Based on the foregoing, computer systems for identifying new web pages of interest to a client have been disclosed. However, numerous modifications and substitutions can be made without deviating from the scope of the present invention. Therefore, the invention has been disclosed by way of illustration and not limitation and reference should be made to the following claims to determine the scope of the present invention.

We claim:

1. A computer network for identifying web pages of interest to a user, said network comprising:
    a server computer comprising
        cataloging means for defining a hierarchy of subject categories, assigning a multitude of web pages to said categories based on subjects of said web pages and
        periodically assigning additional web pages to said categories based on subjects of said additional web pages; and
    profile building means, responsive to selection of a category by said user, for identifying other categories that descend from the selected category, responsive to selection of one of said other categories by said user, for identifying still other categories that descend from said one other category, for recording said selected categories and responsive to a request by said user to identify web pages of interest, for identifying hot links to web pages assigned to said selected categories; and
    a client computer physically distanced from but coupled to said server computer and having a web browser which displays web pages defining said hierarchy, permits said user to make said selections of categories and request the identity of web pages of interest, displays the identified hot links and permits the user to select the identified hot links.

2. A computer network as set forth in claim 1 wherein said categories include other hot links to respective data web pages, said other hot links being displayed by said web browser within web pages that concurrently display said categories, said identified hot links and said other hot links bypassing said server computer, whereby when said user selects said identified hot links and said other hot links respective htmls are sent from other server computer(s) to said client computer bypassing the first said server computer.

3. A computer network as set forth in claim 2 wherein web pages defined by said identified hot links and said other hot links include hot links to still other web pages and when said user selects said still other hot links from said client computer respective htmls are sent from other server computer(s) to said client computer bypassing said first server computer.

4. A computer network as set forth in claim 2 wherein said user requests an identity of recently added web pages from the categories previously selected by said user but not the identity of other web pages added prior to said recently added web pages, and said server computer complies with said request for recently added web pages.

5. A computer network as set forth in claim 1 wherein
    said profile building means is logically or physically interposed between said cataloging means and said user;
    said web browser concurrently displays said categories with other hot links to respective web pages; and
    said profile building means provides a web address of said profile building means for said other hot links and said identifying hot links so that when said user selects said other hot links and said identifying hot links, said selections for said other hot links and said identifying hot links are sent to said profile building means, and said profile building means sends respective fetch requests to other server computer(s) that store web pages corresponding to said other hot links and said identified hot links.

6. A computer network as set forth in claim 5 wherein additional hot links within said web pages corresponding to said other hot links and said identified hot links were assigned to respective categorizes before said user selects them, and when said user selects said additional hot links said profile building means records the respective categories, and when said user requests an identity of web pages of interest, said profile building means identifies hot links to web pages from said selected categories and hot links to other web pages in categories in which said additional web pages were categorized.

7. A computer network as set forth in claim 1 wherein said profile building means responds to said request for web pages of interest by identifying recently added web pages from the selected categories and not identifying other web pages added prior to said recently added web pages.

8. A method for identifying web pages of interest to a user operating a client computer linked to a server computer, said method comprising the steps of:
    said server computer defining a hierarchy of subject categories, assigning a multitude of web pages to said categories based on subjects of said web pages and subsequently assigning additional web pages to said categories based on subjects of said additional web pages;
    said client computer fetching and displaying web pages defining said hierarchy and permitting said user to select a plurality of said categories;
    said server computer, in response to selection of each of said plurality of categories, identifying other categories that descend from the selected category and recording said selected categories;
    said client computer permitting said user to request web pages of interest to said user;
    said server computer, in response to said request by said user to identify web pages of interest, identifying hot links to web pages assigned to said selected categories; and
    said client computer displaying web pages containing said hot links and permitting said user to make said selections of identified hot links.

9. A method as set forth in claim 8 wherein said categories include other hot links to respective data web pages; and said client computer displays said other hot links within web pages that concurrently display said categories, said identified hot links and said other hot links bypassing said server computer, whereby when said user selects said identified hot links and said other hot links respective htmls are sent from other server computer(s) to said client computer bypassing the first said server computer.

10. A method as set forth in claim 9 wherein web pages defined by said identified hot links and said other hot links include hot links to still other web pages and when said user selects said still other hot links from said client computer respective htmls are sent from other server computer(s) to said client computer bypassing said first server computer.

11. A method as set forth in claim 9 further comprising the steps of said user requesting an identity of recently added web pages from the categories previously selected by said user but not the identity of other web pages added prior to said recently added web pages, and said server computer complies with said request for recently added web pages.

12. A method as set forth in claim 8 wherein said server computer responds to said request for web pages of interest by identifying recently added web pages from the selected categories and not identifying other web pages added prior to said recently added web pages.

13. A computer program product for identifying web pages of interest to a user operating a client computer linked to a server computer, said computer program product comprising:

a computer readable medium;

first program instruction means for execution in said server computer to instruct a processor to define a hierarchy of subject categories, assign a multitude of web pages to said categories based on subjects of said web pages and subsequently assign additional web pages to said categories based on subjects of said additional web pages;

second program instruction means for execution in said client computer to instruct a processor to fetch and display web pages defining said hierarchy and permit said user to select a plurality of said categories;

third program instruction means for execution in said server computer to instruct a processor, in response to selection of each of said plurality of categories, to identify other categories that descend from the selected category and record said selected categories;

fourth program instruction means for execution in said client computer to instruct a processor to permit said user to request web pages of interest to said user;

fifth program instruction means for execution in said server computer to instruct a processor, in response to said request by said user to identify web pages of interest, to identify hot links to web pages assigned to said selected categories; and sixth program instruction means for execution in said client computer to instruct a processor to display web pages containing said hot links and permit said user to make said selections of identified hot links; and wherein all of said program instruction means are recorded on said medium.

14. A computer program product as set forth in claim 13 further comprising seventh program instruction means for execution in said server computer to instruct a processor to respond to said request for web pages of interest by identifying recently added web pages from the selected categories and not identifying other web pages added prior to said recently added web pages; and wherein said seventh program instruction means is recorded on said medium.

* * * * *